US006319305B1

(12) United States Patent
Phillips et al.

(10) Patent No.: US 6,319,305 B1
(45) Date of Patent: Nov. 20, 2001

(54) GAS GENERATING SYSTEM

(75) Inventors: Robert John Phillips, Devon; Adrian Simons, Somerset; John Anthony Kilner, Surrey; Jonathan Andrew Lane, London, all of (GB)

(73) Assignee: NormalAir-Garret (Holdings) Limited, Yeovil (GB)

( * ) Notice: Subject to any disclaimer, the term of this patent is extended or adjusted under 35 U.S.C. 154(b) by 0 days.

(21) Appl. No.: 09/426,203

(22) Filed: Oct. 25, 1999

(30) Foreign Application Priority Data

Oct. 29, 1998 (GB) ................................................ 9823651

(51) Int. Cl.[7] ............................ B01D 53/22; B01D 53/47

(52) U.S. Cl. ............................ 96/4; 96/9; 96/134; 96/142

(58) Field of Search ................................ 95/47, 54, 130, 95/138; 96/4, 7–9, 134–136, 142–144

(56) References Cited

U.S. PATENT DOCUMENTS

| | | | | |
|---|---|---|---|---|
| 4,264,338 | * | 4/1981 | Null | 95/47 |
| 4,681,602 | | 7/1987 | Glenn | 55/21 |
| 4,701,187 | * | 10/1987 | Choe et al. | 95/54 X |
| 4,744,803 | * | 5/1988 | Knaebel | 96/144 X |
| 4,765,804 | * | 8/1988 | Lloyd-Williams et al. | 95/54 |
| 4,832,714 | * | 5/1989 | Gerdts | 96/136 X |
| 4,881,953 | * | 11/1989 | Prasad et al. | 95/54 X |
| 4,894,068 | * | 1/1990 | Rice | 95/54 X |
| 5,069,692 | * | 12/1991 | Grennan et al. | 96/136 X |
| 5,102,432 | * | 4/1992 | Prasad | 95/54 |
| 5,108,465 | * | 4/1992 | Bauer et al. | 95/54 |
| 5,160,713 | * | 11/1992 | Mazanec et al. | 95/54 X |
| 5,169,415 | * | 12/1992 | Roettger et al. | 95/54 |
| 5,174,866 | * | 12/1992 | Chen et al. | 95/54 X |
| 5,207,806 | * | 5/1993 | Lagree et al. | 95/47 X |
| 5,226,931 | * | 7/1993 | Combier | 96/134 X |
| 5,332,424 | * | 7/1994 | Rao et al. | 95/47 |
| 5,378,263 | * | 1/1995 | Prasad | 95/54 |
| 5,429,664 | * | 7/1995 | Lee | 95/54 |
| 5,447,555 | * | 9/1995 | Yee et al. | 95/54 |
| 5,709,732 | * | 1/1998 | Prasad | 95/54 X |
| 5,733,435 | * | 3/1998 | Prasad et al. | 95/54 X |
| 5,809,999 | | 9/1998 | Lang | 128/200.24 |
| 5,944,874 | * | 8/1999 | Prasad et al. | 95/54 |
| 5,976,223 | * | 11/1999 | Prasad et al. | 95/54 X |
| 6,132,693 | * | 10/2000 | Gruenwald et al. | 96/143 X |

FOREIGN PATENT DOCUMENTS

| | | | | |
|---|---|---|---|---|
| 0 663 230 A2 | | 7/1995 | (EP) . | |
| 0596268 | * | 5/1994 | (EP) | 95/47 |
| 2257054 A | | 1/1993 | (GB) . | |
| 01-252502 | * | 10/1989 | (JP) | 95/47 |
| 04-090819 | * | 3/1992 | (JP) | 95/54 |
| WO 97/07053 | | 2/1997 | (WO) . | |

* cited by examiner

*Primary Examiner*—Robert H. Spitzer
(74) *Attorney, Agent, or Firm*—Marshall, Gerstein, & Borun

(57) ABSTRACT

A gas generating system for generating a supply of oxygen or at least an oxygen rich gas, and a residual gas, the system including a first gas separation device for separating from a supply gas, a first gas being oxygen enriched gas, to leave a residual gas. The first oxygen enriched gas from the first gas separation device is communicated to a second gas separation device for further separating from the first oxygen enriched gas, oxygen gas. The second gas separation device generating a product gas which is at least highly oxygen enriched and a further residual gas, with at least one of the first and second gas separating devices including a ceramic membrane through which in use gas ions diffuse.

12 Claims, 2 Drawing Sheets

GAS GENERATING SYSTEM

BACKGROUND TO THE INVENTION

This invention relates to a gas generating system, and more particularly to such a system which generates two different gases by separating the gases from a supply gas, which may be air.

DESCRIPTION OF THE PRIOR ART

Oxygen generating systems are known. These may typically comprise a molecular sieve oxygen generating system (MSOGS) which utilises pressure swing technology and a molecular sieve bed e.g. a zeolite bed, to adsorb nitrogen from air, thus separating oxygen from the nitrogen. Such MSOGS usually have two or three sieve beds which are cycled through on-stream/generating and off-stream/purge cycles to permit sequential purging of the sieve beds when contaminated with nitrogen. Such MSOGS are capable of producing low pressure oxygen, to a concentration of up to 95% in the product gas. The nitrogen which is purged from the beds typically is a residual or waste gas which is exhausted.

Molecular sieve inert gas generating systems (MSIGGS) have also been proposed which operate on a similar principle to MSOGS, but the molecular sieve bed adsorbs oxygen from the supply gas, so that the product gas is nitrogen enriched and the residual gas (although this may be put to an auxiliary use) is oxygen.

Other kinds of oxygen/nitrogen generating systems are known, for example permeable membrane devices which permit a gas component in the supply gas, such as nitrogen, to permeate through the, typically polymeric, membrane, the oxygen or the nitrogen enriched gas being the product gas, and the nitrogen enriched or the oxygen enriched gas comprising residual gas respectively.

More recently it has been proposed to generate oxygen on-board an aircraft using a ceramic membrane oxygen generating device (COG). Such devices operate on the principle that certain ceramic materials, which are ionic conductors of oxygen, become electrically conductive at elevated temperatures due to the mobility of oxygen ions within the crystal lattice. Thus by passing an electrical current through a membrane of such ceramic materials, whilst a supply gas containing oxygen is supplied to one face of the membrane, oxygen in the supply gas diffuses through the membrane by ionic transport when the membrane is at a required elevated temperature, and may be recovered for use from the other face of the membrane.

A COG has advantages in that the product gas may comprise 100% oxygen, and the oxygen may be generated at pressure so that there is a lesser requirement to pressurise the product gas for use, as can be the case with a MSOGS for example.

It has been found that with known COG technologies, a COG operates more efficiently when the supply gas is richer in product gas. Thus for example, a COG will operate relatively inefficiently when used to separate oxygen at a concentration of about 21%, from supply gas comprising air, than where the supply gas has a greater concentration of oxygen than this.

MSOGS, permeable membrane oxygen generating devices and COGS have been put to use to generate oxygen on-board an aircraft and devices which operate according to such technologies will generically be referred to hereinafter as OBOG (on-board oxygen generating) devices. In order for the oxygen generated by such OBOG devices to be usable e.g. for breathing by an aircrew, the oxygen needs to be in a pressurised state. In OBOG devices in which oxygen gas cannot be produced at sufficient pressure, it is a requirement to provide some gas compression means.

It is also a requirement in an aircraft for an inert gas, such as nitrogen to be provided to the aircraft fuel tanks to fill voids in the fuel tanks both to maintain a desired pressure on the fuel and to replace fuel as the fuel is used, as well as to minimise the risk of fire/explosion in the fuel tanks. Conventionally such inert gas has comprised predominantly nitrogen with a concentration of oxygen of 9% or less. Such gas has been provided from storage tanks of compressed nitrogen in the aircraft although it is known to provide an on-board inert gas generator (OBIGG) device of the molecular sieve bed or permeable membrane type to generate such nitrogen from air.

In a high performance aircraft particularly, but not exclusively, great efforts are made to reduce weight to a minimum as well as of course to save space and ensure reliability whilst presenting a minimum maintenance burden. It will be appreciated that the provision of compression equipment and gas storage tanks is therefore undesirable.

In U.S. Pat. No. 4,681,602 there is proposed a system which utilises molecular sieve bed and/or permeable membrane technology, to produce first, oxygen for use for breathing by an aircrew, and second, nitrogen for use as an inert environment in the fuel tanks of an aircraft. Thus the requirement to provide storage tanks for compressed oxygen and/or nitrogen is avoided. However such system still requires the provision of compressors, and for both the oxygen, in order that the oxygen can be delivered at an appropriate pressure for breathing, and for the nitrogen. Also, the concentration of oxygen which can be produced is restricted by virtue of the nature of the conventional OBOG device technology which is used.

SUMMARY OF THE INVENTION

According to a first aspect of the invention we provide a gas generating system for generating a supply of oxygen or oxygen rich gas, and a residual gas, the system including a first gas separation device for separating from a supply gas, first gas being oxygen enriched gas, to leave residual gas, means to provide the first oxygen enriched gas from the first gas separation device to a second gas separation device for further separating from the first oxygen enriched gas, oxygen gas, the second gas separation device generating product gas which is at least highly oxygen enriched and further residual gas, at least one of the first and second gas separating devices including a ceramic membrane through which in use gas, ions diffuse.

Where the ceramic membrane device is an oxygen producing device, the present invention provides the advantage that at least highly oxygen enriched product gas, which may be 100% or substantially 100% oxygen, is produced, but whether the ceramic membrane device is an oxygen producing or inert gas producing device, less or no gas compression before use is required compared with for example, oxygen enriched product gas from more conventional e.g. MSOG device or permeable membrane technologies, because by the nature of a COG device, the product gas is pressurised by the electrical energy which causes the gaseous ions to diffuse through the ceramic membrane.

Thus improved quality product gas is provided, and the use of compressors to compress the product gas may be lessened or avoided altogether.

Typically the residual gas generated by the first and second gas separation devices is generally inert i.e. where the supply gas is air, the residual gas will comprise predominantly nitrogen. Means may be provided to feed residual gas from at least one of the first and second gas separation devices for use as an inert environment.

Preferably residual gas from the gas separation device having the ceramic membrane is fed for use as an inert atmosphere. Thus in the event that the other gas separation device is a MSOG device for example, residual gas from that gas separation device may simply be exhausted. Thus the efficiency of operation of the MSOG device is not compromised as can occur where the there is any resistance to the outflow of residual gas from the MSOG. Of course where both the gas separation devices are COG devices, residual gas from both gas separation devices may be put to use as an inert atmosphere.

Where the invention is applied to aircraft use the residual gas may be fed to provide an inert atmosphere in a fuel tank of the aircraft.

Where the first and second gas separation devices are of different kinds, preferably the second gas separation device is of the kind having a ceramic membrane. The first gas separation device may thus be a pressure swing molecular sieve bed type device and/or a permeable membrane device for examples. Thus the COG device will be supplied with oxygen enriched gas from the first gas separation device and will operate most efficiently.

In one embodiment the system may include a third gas separation device downstream of the first gas separation device and upstream of the second gas separation device, the third gas separation device receiving first oxygen enriched gas from the first gas separation device and further separating from the first oxygen enriched gas, oxygen gas, to produce a highly oxygen enriched gas supply, the highly oxygen enriched gas supply being divided into a first supply for first use, and a second supply which is fed to the second gas separation device which is of the ceramic membrane kind.

The first use may be for example for normal breathing where a less oxygen rich gas is acceptable. The product gas from the second gas separation may thus be virtually 100% oxygen and may be used where a very pure oxygen supply is required e.g. to replenish an emergency oxygen supply for use in the event of a system failure or other malfunction resulting in the usual oxygen breathing supply being unavailable or inadequate.

In another embodiment the first, oxygen enriched gas from the first gas separation device is divided into a first supply which is fed to a third gas separation device which separates residual gas from the first oxygen enriched gas and a second supply which is fed to the second gas separation device.

In this case, the residual gas from the third gas separation device may be generally inert and may be fed for use as an inert atmosphere.

Where a third gas separation device is provided this may be of the pressure swing molecular sieve kind and/or the gas permeable membrane kind and/or the ceramic membrane kind as desired, but preferably the second gas separation device at least is of the ceramic membrane kind having a ceramic membrane through which in use oxygen ions diffuse, so that the product highly oxygen enriched gas from the second gas separation device may be fed to a storage means as used as an emergency or back-up supply e.g. in the event of system malfunction.

It will be appreciated that in a system according to the first aspect of the invention there is a minimal requirement for the provision of any means to pressurise either the oxygen rich or inert gases for use, due to the use of the COG device. Avoidance of compressors and the like compared to the arrangement in U.S. Pat. No. 4,681,602 may otherwise be achieved, with or without the use of COG technology.

According to a second aspect of the invention we provide an aircraft having a gas generating system according to the first aspect of the invention.

BRIEF DESCRIPTION OF THE DRAWINGS

The invention will now be described with reference to the accompanying drawing which.

DESCRIPTION OF THE PREFERRED EMBODIMENTS

Figure 1:
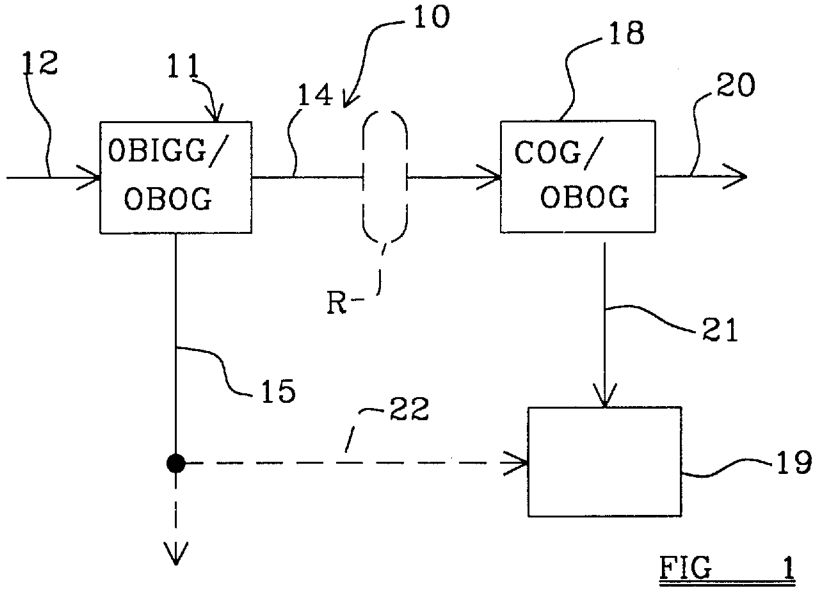
FIG. 1 is a purely diagrammatic illustration of a first embodiment of a gas generating device in accordance with the invention.

Referring to FIG. 1 of the drawings there is shown a gas generating system 10 in accordance with the present invention for use in an aircraft, the system 10 comprising a first gas separating device 11 which receives supply gas from an inlet 12. The supply gas may be ambient air from an uncompressed compartment of an aircraft, or engine bleed air for examples, but in each case the supply gas will be a mixture of gases including oxygen, and where the supply gas is air, nitrogen too.

The air or other supply gas may be pressurised, but where this is not so, a fan or the like may be required to impel the supply gas from the inlet 12, into the first gas separation device 11.

The first gas separation device 11 in this example, may be an OBOG device being a molecular sieve bed device, having usually a plurality of molecular sieve beds operated cyclically, whereby, depending on the pressure in the beds, predominantly nitrogen in the supply gas is adsorbed by e.g. zeolite or other molecular sieve bed material so that a first, product, gas being oxygen enriched gas, is generated, or nitrogen is purged from the bed material as a residual gas.

Because the first gas separation device 11 comprises a plurality of beds operated cyclically, a supply of first oxygen enriched gas, and a steady stream of residual gas is produced.

The first oxygen enriched gas is fed along a first feed line 14 from the first gas separation device 11, and the residual gas is fed to a second feed line 15 from where the residual gas may be exhausted or put to use as hereinafter explained.

The first oxygen enriched gas is fed along the first feed line 14 to a second gas separation device 18 which comprises a ceramic membrane type oxygen separation device.

If necessary, to ensure an adequate supply of the first oxygen rich gas to the second gas separation device 18 as the first gas separation device 11 cycles, a reservoir R may be provided in the first feed line 14.

The construction and operation of the ceramic membrane type second gas separation device 18 may vary depending on the requirements of the system 10. A detailed description of the construction and operation of a ceramic membrane type gas separation device 18 is not essential for realising the invention. Suffice it to say that such a ceramic membrane oxygen generating device 18 (COG) operates on the principle that certain ceramic materials, (e.g. Cerium Gadolinium Oxide (CGO) coated on both sides with an electrode made of Lanthanum Strontium Cobalt Ferrite (LSCF) to form a membrane) which are ionic conductors of oxygen, become electrically conductive at elevated temperatures due to the mobility of oxygen ions within the crystal lattice. Thus by passing an electrical current through a membrane of such ceramic materials, whilst a supply gas containing oxygen is supplied to one face of the membrane, oxygen in the supply gas diffuses through the membrane by ionic transport when the membrane is at a required elevated temperature, and may be recovered for use from the other face of the membrane.

A ceramic membrane type device which has a membrane through which other gaseous ions diffuse may be similarly constructed but use different ceramic materials. Thus a ceramic inert gas generator (CIGG) device may similarly be provided.

A fuller description of an example of a ceramic membrane type gas separation device is given in for example our previous International patent application published on Feb. 2, 1997 under publication number WO97/07053 to which reference is to be made.

Returning to FIG. 1 of the drawing of this application, in the example shown, oxygen thus generated by the second gas separation device 18, which may be 100% pure oxygen, is fed to a product gas line 20 from where it may be used for breathing by an aircrew. By the nature of the ceramic membrane oxygen generating device 18, the oxygen generated is at pressure and so there may be no requirement to pressurise the oxygen prior to use, or at least no requirement to pressurise the oxygen to the extent required in the case of oxygen enriched gas produced by a conventional pressure swing molecular sieve bed or gas permeable membrane type gas separation device.

The residual gas from the first gas separation device 11 is predominantly nitrogen and is fed along the second feed line 15. At least a portion of the residual gas from line 15 may be put to use as an inert atmosphere in fuel tanks 19 of the aircraft. In dotted lines in the drawing there is shown a feed line 22 from line 15 to the fuel tanks 19, Where the first gas separation device 11 is a MSOG device though, preferably the residual gas is exhausted so as not to impose any resistance on the flow of residual gas from the device which could affect the efficiency and operation of the MSOG device 11.

Residual gas which is continually produced by the second gas separation device 18 and will be generally at the pressure of the first oxygen rich gas component provided by the first oxygen generation device 11 along line 14, is however readily available to replace fuel which is used up out of the tanks 19, and is fed to the tanks 19 by a feed line 21. If required, the residual gas from the COG device 18 may be pressurised so that the fuel in the tanks 19 is kept at a constant pressure.

Although as described, the first gas separation device 11 is an OBOG device, it will be appreciated that the device 11 could alternatively be an OBIGG device. In both cases the supply gas from inlet 12 will be separated into oxygen rich and oxygen depleted gas components, but it will be the oxygen rich gas component in the example described which will be provided to the second gas separation device 18.

Further alternatively, although the OBOG or OBIGG device is preferably a MSOG or MSIGG device, alternatively the first device 11 may be a permeable membrane device or even a ceramic membrane device (COG or CIGG device—ceramic inert gas generator device).

Although it is preferred that the second gas separation device 18 is a COG or CIGG device, this could be a MSOG or permeable membrane type device, and the first gas separation device 11 a COG or CIGG device, although the arrangement described is preferred.

Figure 3:
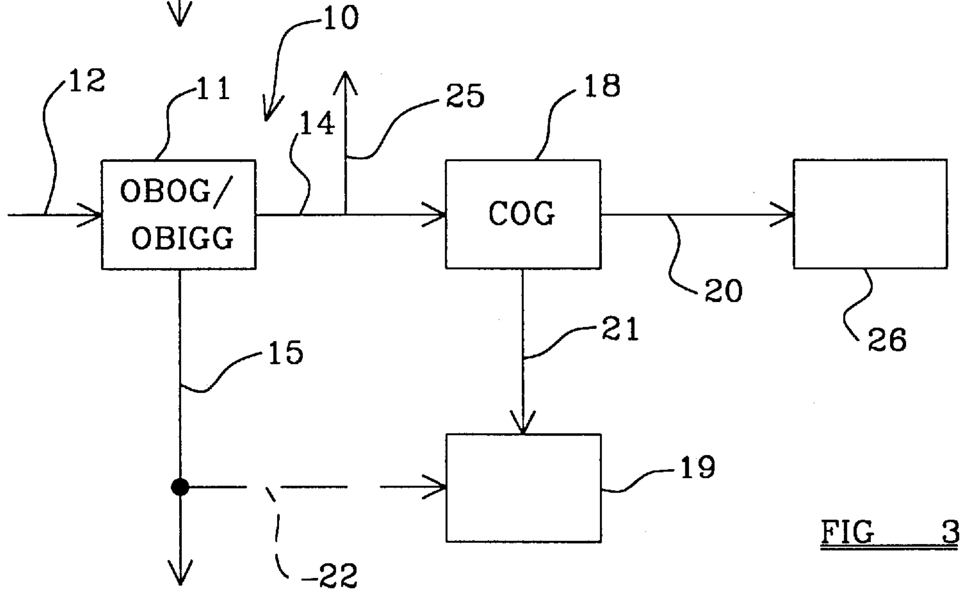
FIG. 3 is a purely diagrammatic illustration of a third embodiment of a gas generating device in accordance with the invention.

FIG. 3 shows a variation on the FIG. 1 embodiment and similar parts are labelled with the same reference numerals.

In this modification, the first oxygen enriched gas from the first gas separation device 11 along line 14 is divided into a supply 25 for breathing use, and a supply to the second gas separation device 18. The second gas separation device 18 may be of relatively small capacity, but is able to generate highly enriched or virtually 100% oxygen product gas which is fed along product gas line 20 for use in filling and replenishing an emergency or back-up oxygen supply 26.

Figure 4:
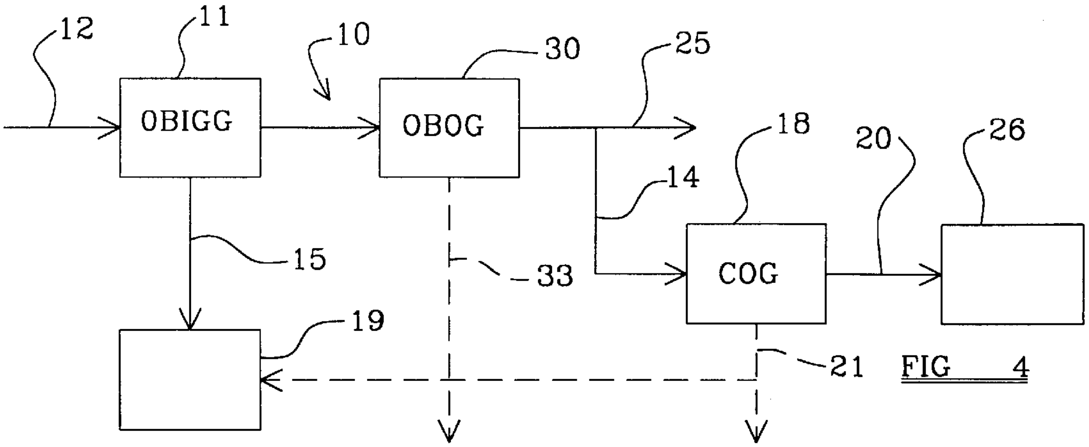
FIG. 4 is a purely diagrammatic illustration of a fourth embodiment of a gas generating device in accordance with the invention.

Referring now to FIG. 4, there is shown another variation on the system 10 of FIG. 1 and thus again, similar parts are labelled with the same reference numerals.

In this modification, a third gas separation device 30 is provided between the first gas separation device 11, which in this example is an OBIGG device, and the second gas separation device 18 which in this example is a relatively small capacity COG device. Because the first gas separation device 11 is an OBIGG device, it produces predominantly nitrogen gas which is fed along a line 15 for use in providing an inert atmosphere in aircraft fuel tanks 19.

Oxygen rich gas component from the OBIGG device 11 may not be sufficiently pure for breathing use and accordingly the third gas separation device 30 is required further to separate oxygen from the first oxygen rich gas from the OBIGG device 11.

The resultant more oxygen enriched gas supply from the third gas separation device 30 is then divided, as with the first product gas in line 14 of the FIG. 3 modification, to provide a supply of normally breathable oxygen rich gas along a feed line 25, and a supply of oxygen rich gas to the second gas separation device 18 which in this arrangement is a small capacity COG device, which delivers product gas along a line 20 for use in for example, filling and/or replenishing an emergency or back-up oxygen supply 26.

Residual nitrogen rich gas from the third gas separation device 30 may be fed therefrom along a line 33 to exhaust and/or for use in e.g. providing an inert atmosphere in the tanks 19 in addition to or instead of the inert gas supply along line 15 from the OBIGG device 11.

Residual gas from the second gas separation device 18 may be exhausted along line 21 and/or fed to the tanks 19 or otherwise put to use as desired.

Figure 5:
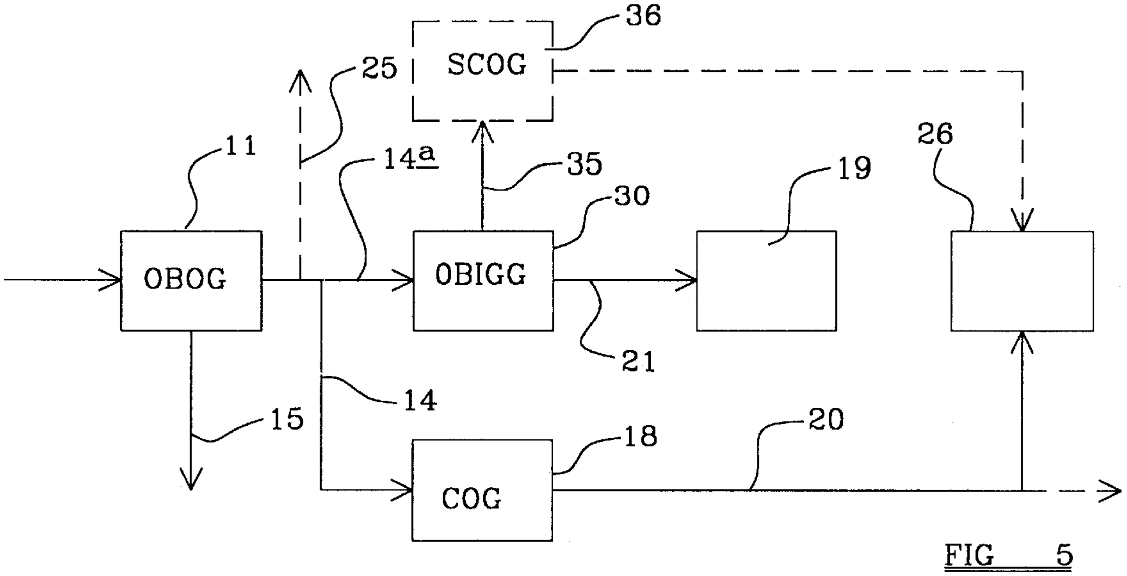
FIG. 5 is a purely diagrammatic illustration of a fifth embodiment of a gas generating device in accordance with the invention.

The arrangement of FIG. 5 also utilises a third gas seperation device 30 which in the example shown may be an OBIGG device, whilst the first gas seperation device 11 is in this example an OBOG device, e.g. a MSOG device. Because in general a MSOG device when efficiently producing oxygen rich gas up to 95% oxygen, produces residual gas which although predominantly is nitrogen can contain greater than about 9% oxygen, the residual gas is not readily usable as a inert atmosphere. Thus in this arrangement, the residual gas from the first gas seperation device 11 is simply exhausted along line 15.

The oxygen rich gas component produced by the first gas separation device 11 is divided into a first supply which is fed to the third gas separation device 30 along a line 14*a,* and the nitrogen produced by the third gas separation device 30 is fed along line 21 for use as an inert atmosphere, whilst the oxygen rich gas component from the third gas separation device 30 is preferably simply exhausted along a line 35, but could be fed to a yet further gas separation device 36, which is preferably a COG device, in order to purify the oxygen gas component e.g. for the back-up or emergency supply 26.

The second of the divided supplies from the first gas separation device 11 is fed along a line 14 to the second gas separation device 18 which in this example is a COG device for producing a highly oxygen enriched or virtually 100% pure oxygen product gas for feeding along line 20 for use in breathing and/or to fill and/or replenish an emergency or back-up supply 26.

In the FIG. 5 arrangement, where there is provided a gas separation device as shown in dotted lines at 36, this could comprise a second gas separation device of the system of the invention in which case the gas separation device shown at 18 which receives the second of the divided supply of oxygen enriched gas from the first gas separator device 11, could be omitted.

Figure 2:
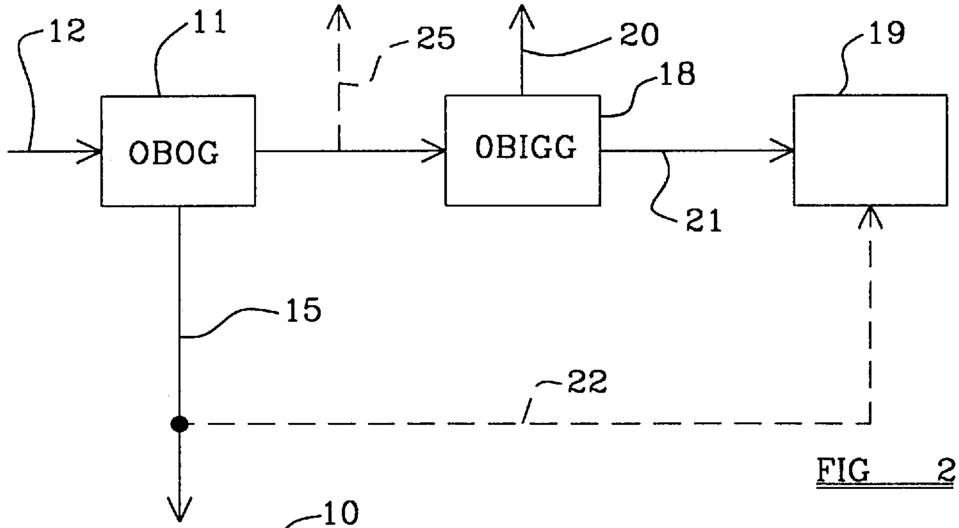
FIG. 2 is a purely diagrammatic illustration of a second embodiment of a gas generating device in accordance with the invention.

FIG. 2 shows an arrangement which is essentially similar to that of FIG. 1, but the first gas separation device 11 is an OBOG device, and the second gas separation device 18 is an OBIGG, the OBOG 11 and/or the OBIGG 18 providing oxygen rich gas component e.g. for breathing use, and the OBIGG 18 providing a nitrogen supply along line 21 for an inert atmosphere in fuel tanks 19 of the aircraft. At least one of the OBOG 11 and OBIGG 18 devices is a ceramic membrane COG/CIGG device.

In each of the embodiments described a ceramic membrane type device is provided which enables the requirement for a compressor or other gas pressurisation means particularly for product gas to be reduced or even avoided altogether.

Although the invention has been described particularly in relation to a gas generation system 10 for use on-board an aircraft, the invention may be utilised in other applications, but in any event, residual gas from the first 11 and/or second gas separation device 18 may not be put to use as an inert atmosphere for fuel 19, but may otherwise be used or simply exhausted.

What is claimed is:

1. A gas generating system for generating a supply of oxygen or oxygen rich gas and a residual gas, the system including a first gas separation device for separating from a supply gas, first gas being oxygen enriched gas, to leave residual gas, means to provide the first oxygen enriched gas from the first gas separation device to a second gas separation device for further separating from the first oxygen enriched gas, oxygen gas, the second gas separation device generating product gas which is at least highly oxygen enriched and further residual gas, characterised in that at least one of the first and second gas separating devices including a ceramic membrane through which in use gas ions diffuse.

2. A system according to claim 1 wherein the residual gas generated by the first and second gas separation devices is generally inert, means being provided to feed residual gas from at least one of the first and second gas separation devices for use as an inert atmosphere.

3. A system according to claim 2 wherein the residual gas from the gas separation device having the ceramic membrane is fed for use as an inert atmosphere.

4. A system according to claim 2 wherein the system is provided in an aircraft, and the residual gas is fed to provide an inert atmosphere in a fuel tank of the aircraft.

5. A system according to claim 1 wherein the second gas separation device is a ceramic membrane and the first gas separation device is a pressure swing molecular sieve bed device and/or a permeable membrane device.

6. A system according to claim 1 wherein the system includes a third gas separation device downstream of the first gas separation device and upstream of the second gas separation device, the third gas separation device receiving first oxygen enriched gas from the first gas separation device and further separating from the first oxygen enriched gas, oxygen gas, to produce at least a highly oxygen enriched gas supply, the highly oxygen enriched gas supply being divided into a first supply for first use, and a second supply which is fed to the second gas separation device.

7. A system according to claim 6 wherein the third gas separation device is a pressure swing molecular sieve and/or a gas permeable membrane and/or a ceramic membrane.

8. A system according to claim 6 wherein the second gas separation device is a ceramic membrane through which in use oxygen ions diffuse, and the at least highly enriched oxygen gas from the second gas separation device is fed to a storage means.

9. A system according to claim 8 wherein the storage means is for use as an emergency supply.

10. A system according to claim 1 wherein the first oxygen enriched gas from the first gas separation device is divided into a first supply which is fed to a third gas separation device which separates residual gas from the first oxygen enriched gas and a second supply which is fed to the second gas separation device.

11. A system according to claim 10 wherein the residual gas from the third gas separation device is generally inert and is fed for use as an inert atmosphere.

12. An aircraft having a gas generating system for generating a supply of oxygen or oxygen rich gas and a residual gas, the system including a first gas separation device for separating from a supply gas, first gas being oxygen enriched gas, to leave residual gas, means to provide the first oxygen enriched gas from the first gas separation device to a second gas separation device for further separating from the first oxygen enriched gas, oxygen gas, the second gas separation device generating product gas which is at least highly oxygen enriched and further residual gas, characterised in that at least one of the first and second gas separating devices including a ceramic membrane through which in use gas ions diffuse.

* * * * *